(12) United States Patent
Yen et al.

(10) Patent No.: US 7,775,494 B2
(45) Date of Patent: Aug. 17, 2010

(54) FOLDABLE HOLDER

(75) Inventors: Ching-Hui Yen, Banciao (TW);
Chien-Cheng Yeh, Banciao (TW)

(73) Assignee: Syncmold Enterprise Corp., Jhonghe (TW)

( * ) Notice: Subject to any disclaimer, the term of this patent is extended or adjusted under 35 U.S.C. 154(b) by 0 days.

(21) Appl. No.: 12/171,381

(22) Filed: Jul. 11, 2008

(65) Prior Publication Data
US 2010/0006719 A1    Jan. 14, 2010

(51) Int. Cl.
*E04G 3/00* (2006.01)
(52) U.S. Cl. .................. 248/284.1; 248/917; 248/919; 248/122.1; 248/291.1; 248/292.13; 361/679.21; 361/679.22
(58) Field of Classification Search ............... 248/917, 248/919, 920, 162.1, 161, 157, 176.1, 291.1, 248/292.12, 292.13, 292.14, 922, 923, 122.1, 248/125.1, 176.3; 361/682, 683, 679.21, 361/679.22
See application file for complete search history.

(56) References Cited

U.S. PATENT DOCUMENTS

| | | | | |
|---|---|---|---|---|
| 4,944,481 | A * | 7/1990 | Yurchenco et al. | 248/372.1 |
| 6,018,847 | A * | 2/2000 | Lu | 16/337 |
| 6,581,893 | B1 * | 6/2003 | Lu | 248/291.1 |
| 6,796,541 | B2 * | 9/2004 | Lu | 248/291.1 |
| 6,912,120 | B2 * | 6/2005 | Kim et al. | 361/679.06 |
| 7,036,787 | B1 * | 5/2006 | Lin | 248/676 |
| 7,124,984 | B2 * | 10/2006 | Yokouchi et al. | 248/125.8 |
| 7,384,019 | B2 * | 6/2008 | Choi | 248/136 |
| 7,413,152 | B1 * | 8/2008 | Chen | 248/176.1 |
| 7,431,254 | B2 * | 10/2008 | Cheng | 248/292.12 |
| 7,474,522 | B2 * | 1/2009 | Bliven | 361/679.22 |
| 7,497,410 | B2 * | 3/2009 | Lee | 248/398 |
| 7,513,468 | B2 * | 4/2009 | Jung et al. | 248/133 |
| 2002/0020792 | A1 * | 2/2002 | Lee | 248/278.1 |
| 2006/0175476 | A1 * | 8/2006 | Hasegawa et al. | 248/125.1 |
| 2007/0152125 | A1 * | 7/2007 | Lee | 248/398 |

* cited by examiner

*Primary Examiner*—Kimberly T Wood
(74) *Attorney, Agent, or Firm*—C. G. Mersereau; Nikolai & Mersereau, P.A.

(57) ABSTRACT

A foldable holder connecting to and supporting a display comprises a mount and a swinging part. The mount comprises a base and a pillar disposed on the base. The swinging part pivots around the pillar. The display, is disposed at a front side of the swinging part. The swinging part may be folded together with the display so as to be parallel with the base of the mount. Thus, the wasted space caused by the irregular geometry of the holder and the supported LCD can be significantly reduced. The design will greatly simplify the processes of packing, handling, and storage; therefore significantly lower the cost of business shipment. Since most of the unused space in the carton box is eliminated, the quantity of Styrofoam used as filler can also be significantly reduced, which contributing to environmental protection.

7 Claims, 8 Drawing Sheets

US 7,775,494 B2

FOLDABLE HOLDER

BACKGROUND OF THE INVENTION

1. Field of the Invention

This invention relates to a foldable holder and particularly to a holder used to support a LCD display.

2. Description of Related Art

Generally speaking, a holder is a structure used to support a heavy load and has the functions of angular adjustment and height adjustment of the load being held in order to satisfy user needs.

In recent years, Cathode Ray Tube (CRT) displays have been gradually replaced by Liquid Crystal Displays (LCD), which not only have smaller dimensions but also less weight than CRT displays. Thus, unlike the traditional CRT sets, LCDs are often supported and fixed with a holder that may be adjusted and located by the user at different angles for optimal viewing quality.

A general holder used to support the LCD comprises a mount and a backbone upright fixed to the mount. Owing to the display that is in a certain weight, in order to securely support the display, the mount of holder is formed in the shape of a wide, flat plate to be securely located on a table or another platform. Thus, the holder and supported display is geometrically formed, which seems to be unexpectedly huge.

Although the holder is provided for the user to adjust toward the angle and location for the LCD, due to the geometrical shape of holder, a larger carton is a must to pack the holder, and, after packing, a space that is left unused must be filled with Styrofoam or the like to damp the vibration during handling for fear of damage to the LCD or the holder from collision. However, the cost of Styrofoam stuffing must be consumed and the stuffing is a high pollutant, which consumes the cost of business shipment and pollutes the environment.

Due to the geometrical form, the holder and the LCD is inconvenient to the user to handle and store at home, which cannot properly satisfies the user's daily life, at home.

To sum up, the holder and the supported LCD have defects in packing and handling. The defects also reflect to issues on business shipment, daily life at home, and environmental protection. Thus, related industries are going to solve the issue caused by the geometrical form of unexpectedly huge holder and supported LCD for easy packing and handling.

Having these drawbacks of traditional holder design in mind, the inventors dedicated to research and applied theories in creating this new invention which will effectively eliminate the problems described above.

SUMMARY OF THE INVENTION

It is a main object of this invention to provide a foldable holder, which is foldable to combine to reduce a space occupied by the holder and a supported LCD, and manners of packing handling and storage are applied to lower the cost of business shipment and satisfy a user's daily life at home.

It is the other objective of this invention to provide the foldable holder the geometrical structure of which may be simplified together with the supported LCD so as to significantly reduce an unused space of a carton and reduce the quantity of Styrofoam as a filler of high pollution, which brings a quite high benefit in environmental protection.

In order to achieve the object, a foldable holder according to this invention supports a LCD. The holder is provided with a mount comprising a base and a pillar disposed on the base, and a swinging part pivoting around the pillar. The display is disposed at a front side of the swinging part.

This invention brings advantages as follows. The swinging part may be foldable together with the display and parallel with the base of mount. Thus, the space occupied by the holder and the loaded display may be significantly reduced, and the manners of packing, handling and storage are applied to lower the cost of business shipment and satisfy a user's daily life at home.

The swinging part and its connected display and the base after folded for the geometrical form tend to be simplified so as to significantly reduce an unused space of a carton for packing and reduce the quantity of Styrofoam as a filler of high pollution, which brings the quite high benefit in environmental protection.

To understand further the features and technicality of this invention, please refer to the detailed description below along with the drawings; however, the accompanied drawings are provided for reference and illustration only and are not limited to this invention.

DETAILED DESCRIPTION OF THE PREFERRED EMBODIMENTS

In this section, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

With reference to FIGS. 1 through 8 illustrating a foldable holder according to this invention that is used to support a connected display 7 as an electronic display device the holder comprises a mount 1 and a swinging part 2.

Figure 1:
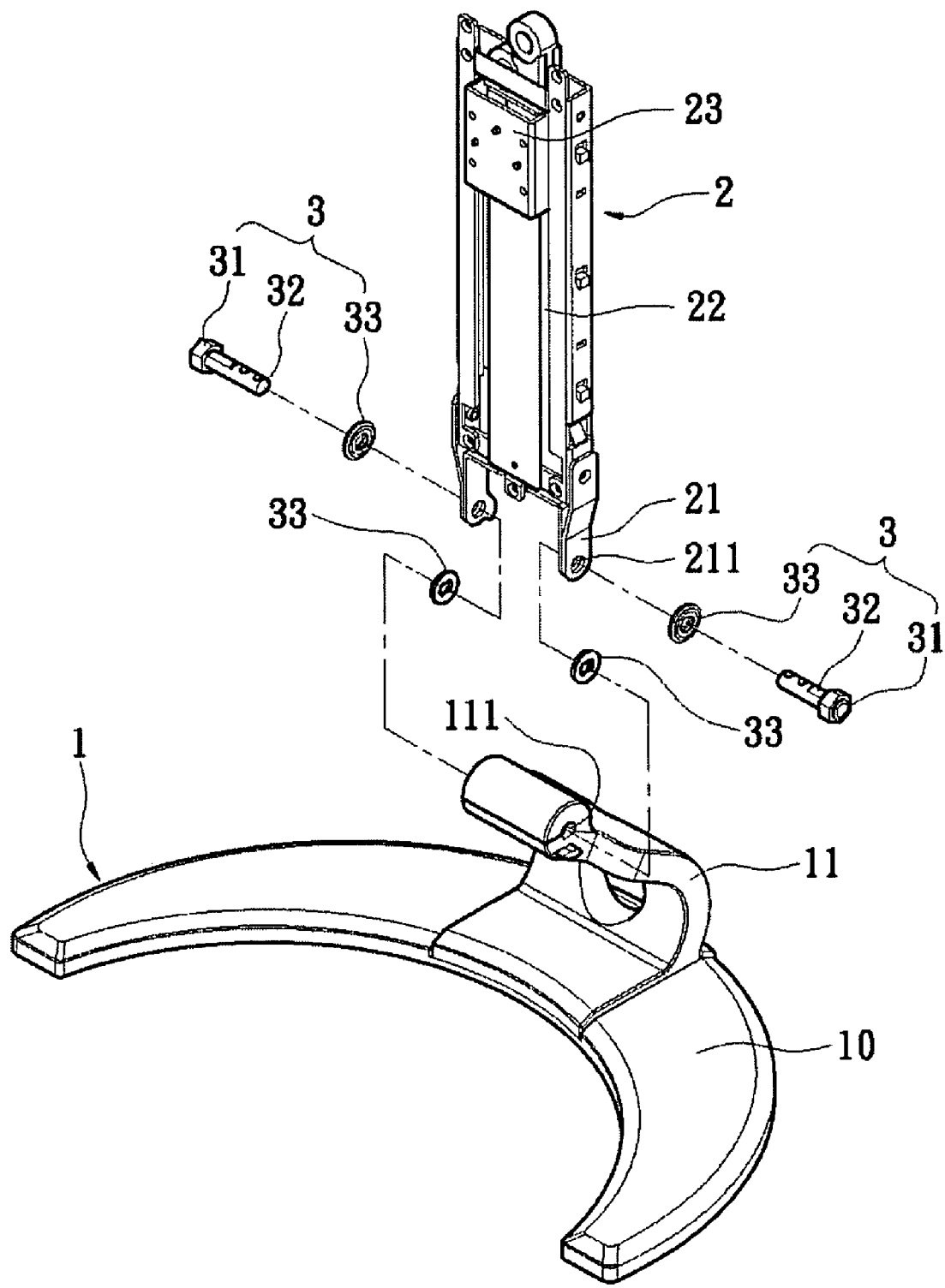
FIG. 1 is an exploded view of a foldable holder according to this invention.
Figure 2:
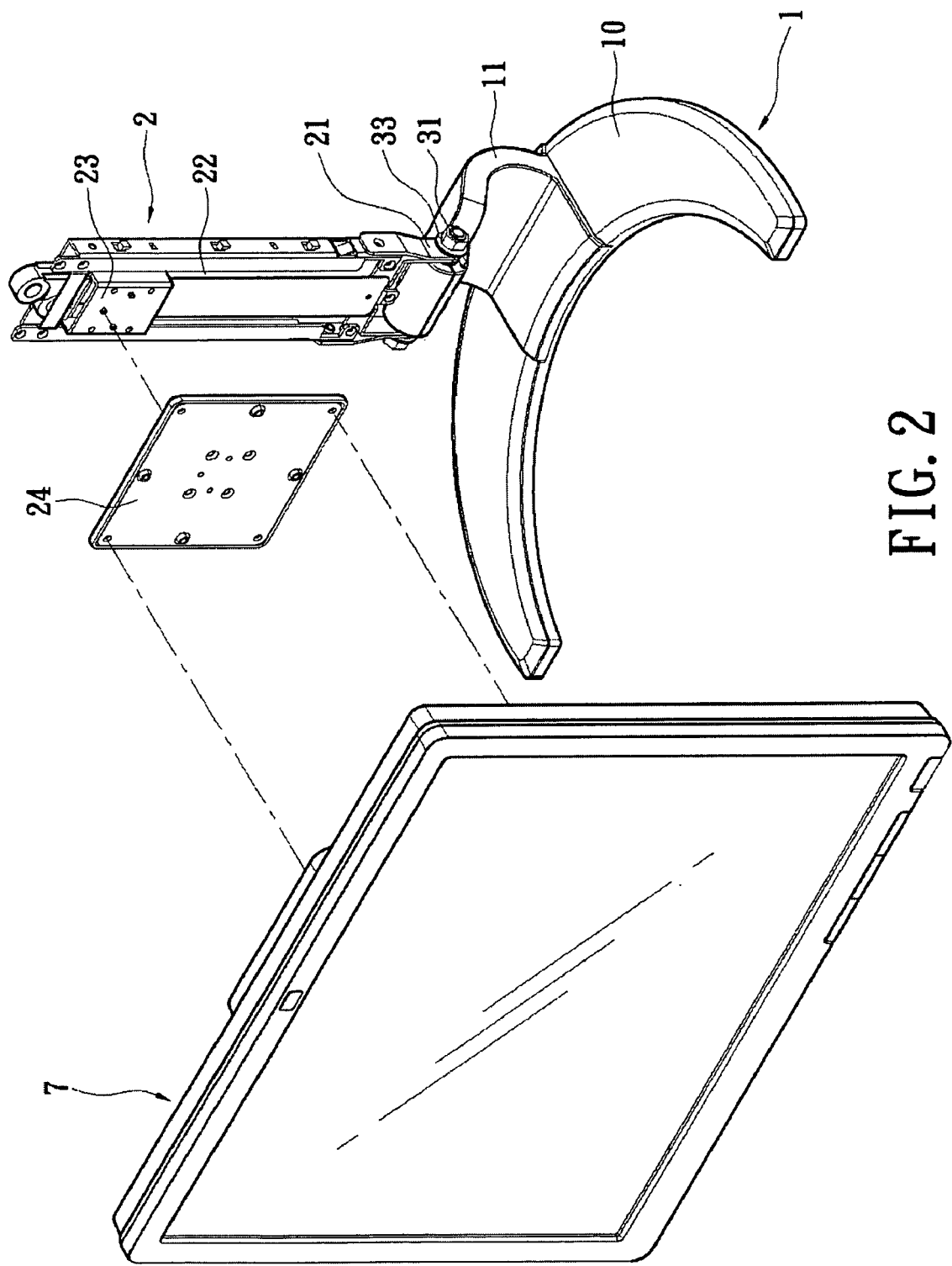
FIG. 2 is a 3D partially exploded view of the holder according to this invention that supports a LCD.
Figure 3:
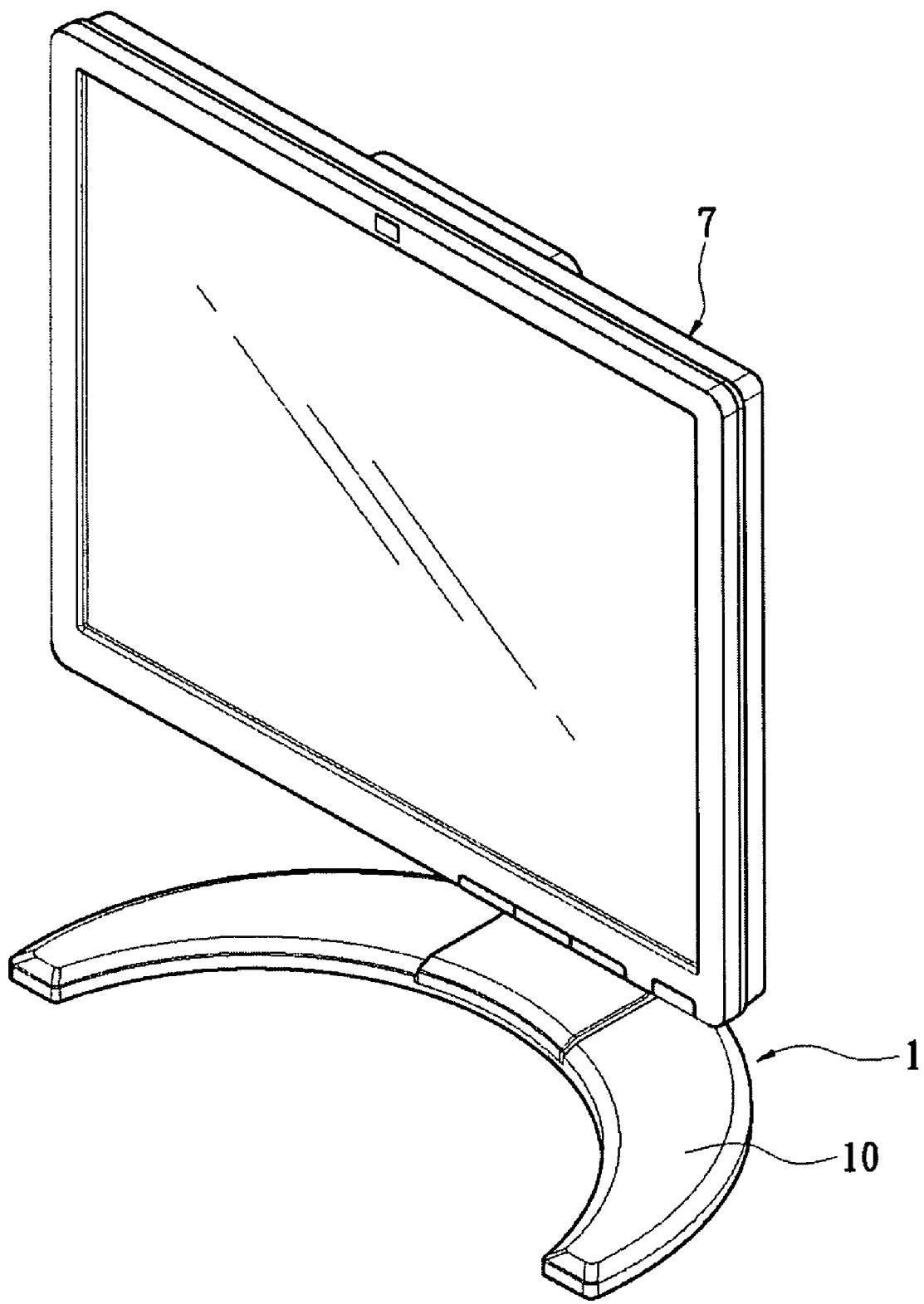
FIG. 3 is a 3D assembly view of the holder according to this invention that supports a LCD.
Figure 4:
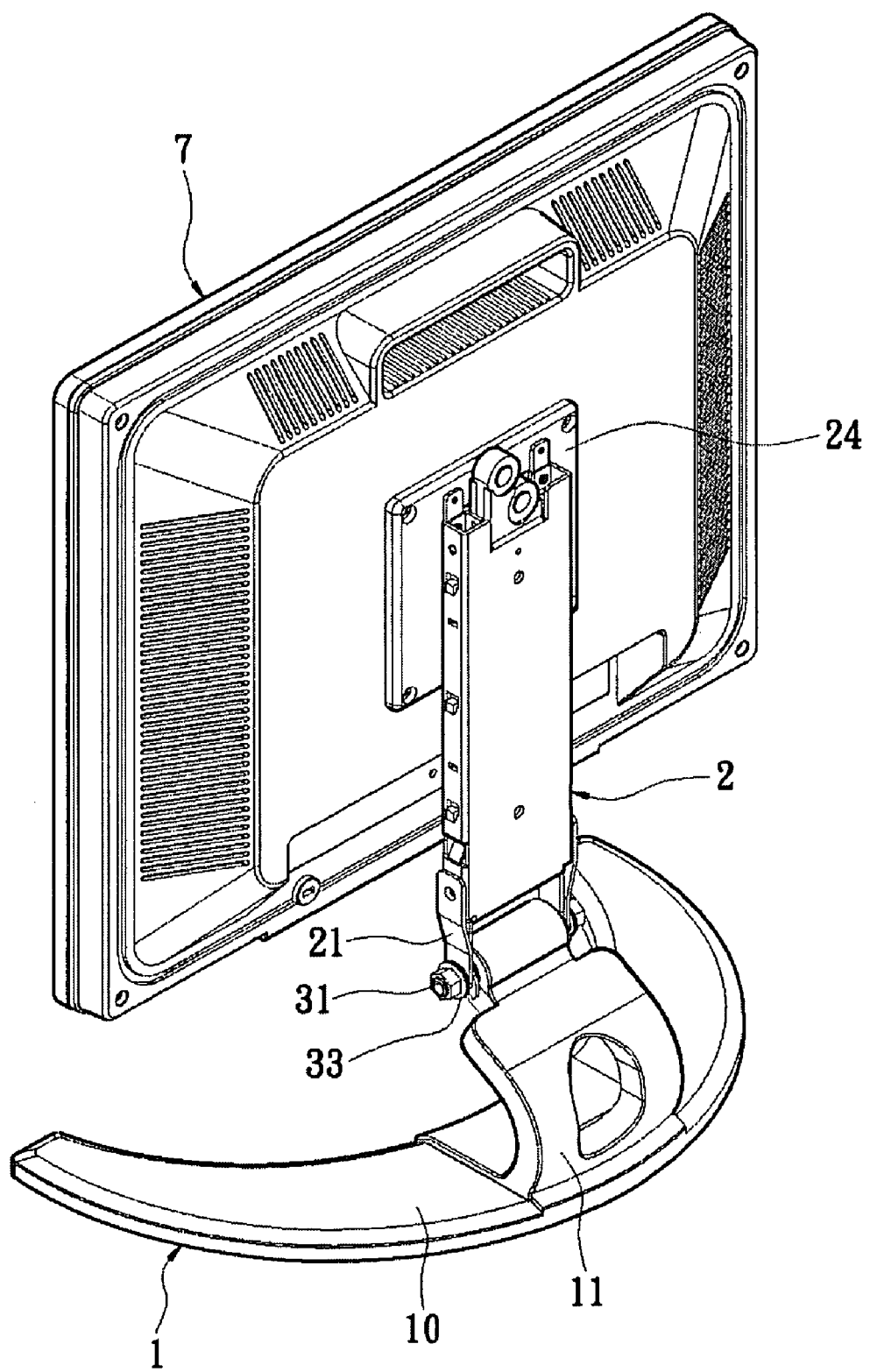
FIG. 4 is a 3D assembly view of the holder according to this invention that supports a LCD, which is seen at another angle of view.

With reference to FIG. 1, the mount 1 comprises a base 10 and a pillar 11 that is fixed onto the base 10.

The base 10 is wholly made of plastics of high strength and is a plate with the approximate shape of a crescent moon. When the holder connects with and support the heavy display 7, the wide, flat base 10 formed geometrically may be used to properly scatter the weight of display 7 so that the display may be securely placed on a table or a random site for prevention of the display 7 from being damaged due to swaying or rocking or dumping.

The pillar 11 is a bent plate and provided with a shaft hole 111 which transversally passes through the pillar 11 and into which a pivot axis and gasket assembly 3 may be inserted around which the pillar 11 and the swinging part 2 can pivot.

The swinging part 2 is formed slightly in the shape of a long plate, the lower end of which pivots around the pillar 11 of the mount 1. The swinging part 2 is provided with two ears 21 that are relatively formed stretching from the lower end of swinging part 2 and that are respectively formed with a pivot hole 211 and set across the openings at the two sides of the shaft hole 111 of the pillar 11, in which the pivot holes 211 of the two ears 21 are corresponding to the shaft holes 111 of the pillar 11.

With reference to FIGS. 1 through 5, the swinging part 2 is provided with at least one slide groove 22, a slide base 23, and a support plate 24. In the embodiment, two slide grooves 22 are formed and lengthways parallel with each other on the front side of swinging part 2. The slide base 23 is provided sliding in the two slide grooves 22. The support plate 24 is fixed onto the slide base 23. Thus, the support plate 24 may slide up and down along the to slide grooves 22 following the slide base 23.

Figure 6:
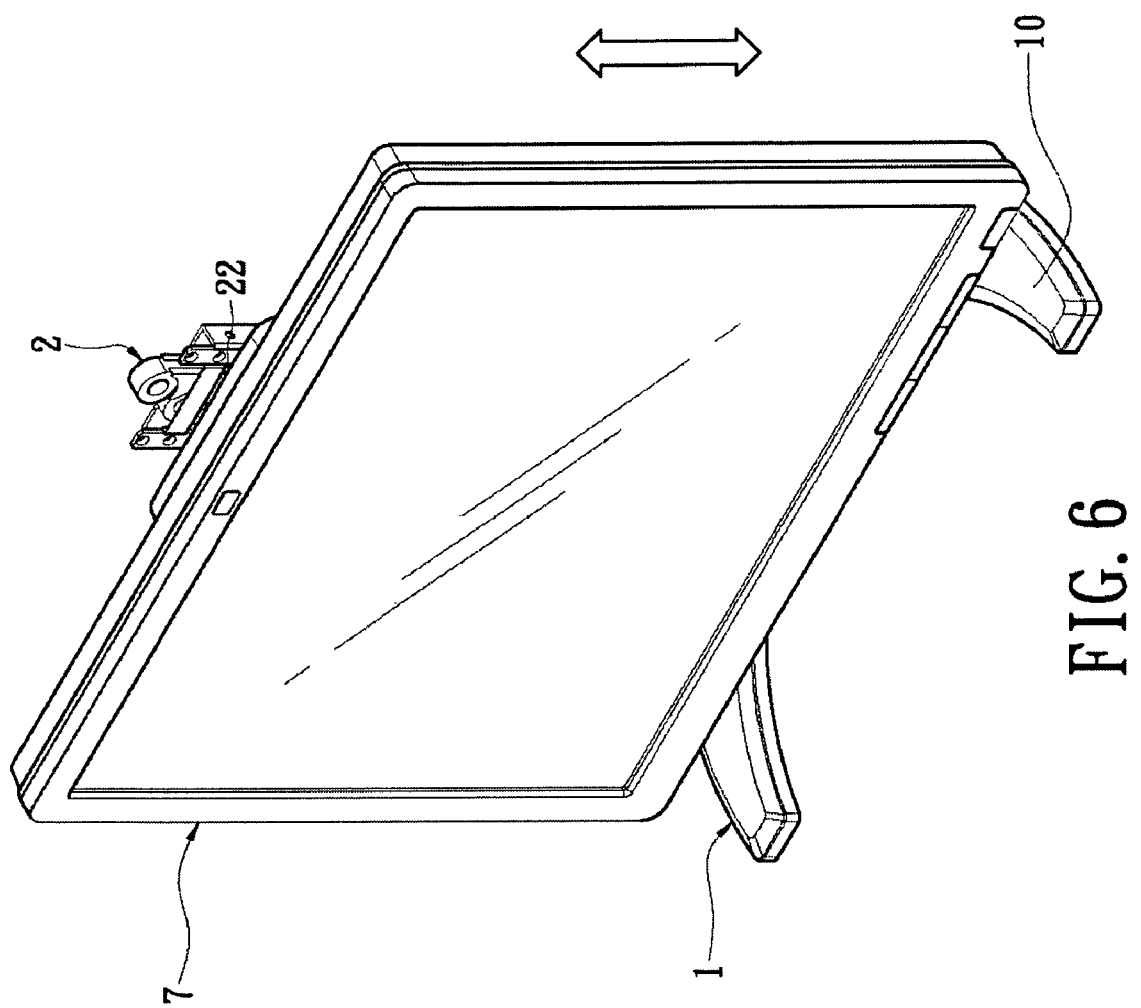
FIG. 6 is a schematic view illustrating the LCD that slides up and down on the holder.

With reference to FIG. 6, the display 7 may be a LCD that is fixed onto the support plate 24 with bolts as connection parts, and may slide up and down on the slide base 23 upon the user's request and may be located at a determined site for the user to view.

It is nevertheless especially noted that the foldable holder according to this invention many connect with and support the LCD, such as a plasma display as an electronic display, and may further be an equivalent change of this invention.

With reference to FIGS. 1 through 5, the swinging part 2 pivots at the end of pillar 11 around at least one pivot axis and gasket assembly 3. Two pivot axis and gasket assemblies 3 are provided, each of which is provided with a pivot axis 32 having a head 31. Each of the pivot axes 32 of the two pivot axis and gasket assemblies 3 passes through each of the pivot holes 211 of the two ears 21 to be inserted into the shaft hole 111; the head 31 of the pivot axis 32 is set close to the outer surface of each of the two ears 21.

A plurality of gaskets 33 are provided on the pivot axis 32, which are positioned between the inner surface of each of the two ears 21 and at the two sides of the pillar 11 and between the outer surface of each of the two ears 21 and the head 31 of pivot axis 32, respectively.

Figure 8:
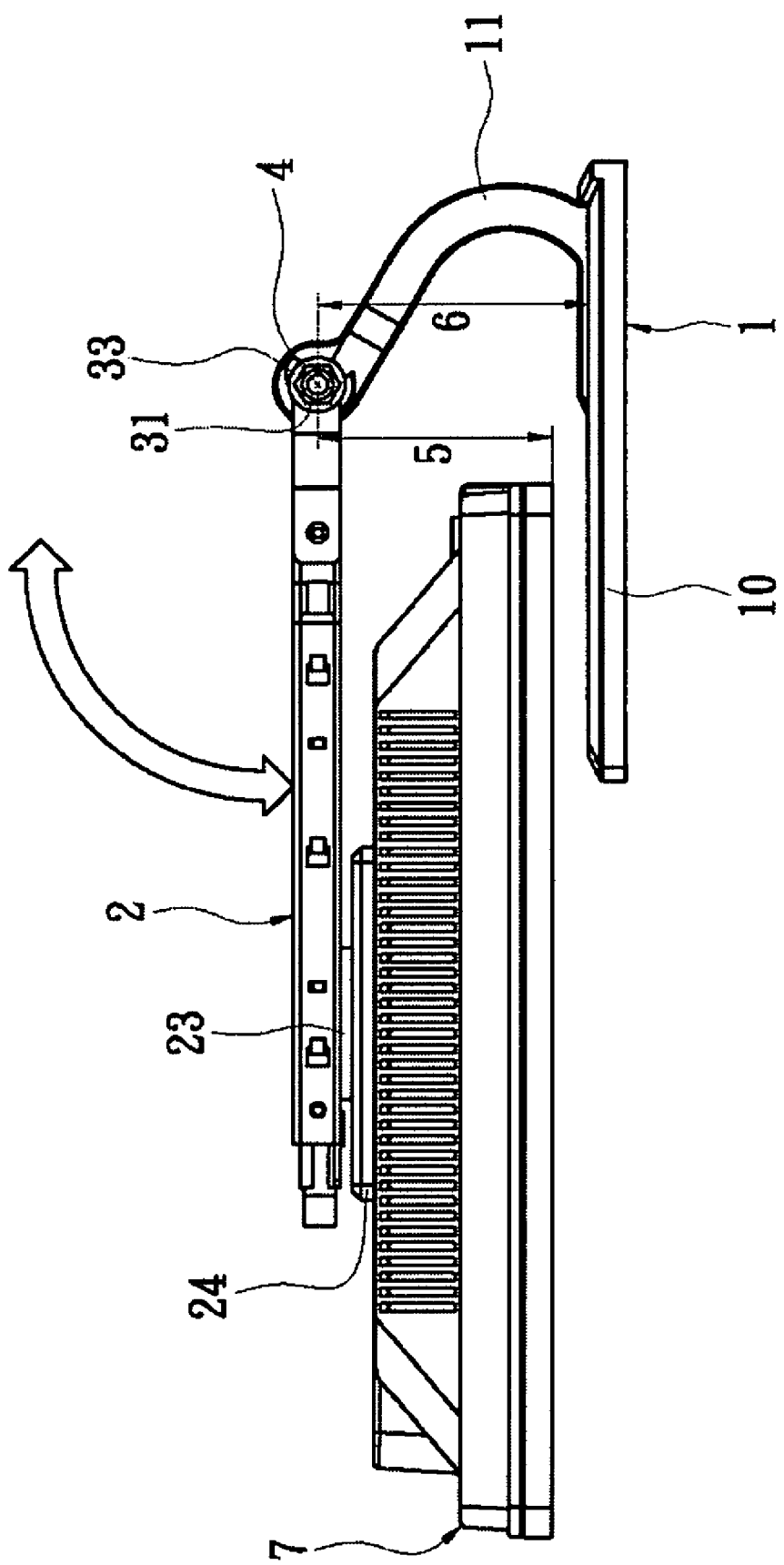
FIG. 8 is a side view of the foldable holder according to this invention that is bent and folded.

The gaskets 33 consist of a plurality of gaskets of various functions to cause an active force of axial compression. When pivoting around the pillar 11, the swinging part 2 may be located at a specified site upon the user's request, as shown in FIG. 8. Further, the gaskets 33 are used to limit the shift of swinging part 2, which prevents the swinging part 2 that is working from colliding or interfering with the base 10 or another mechanism.

Figure 5:
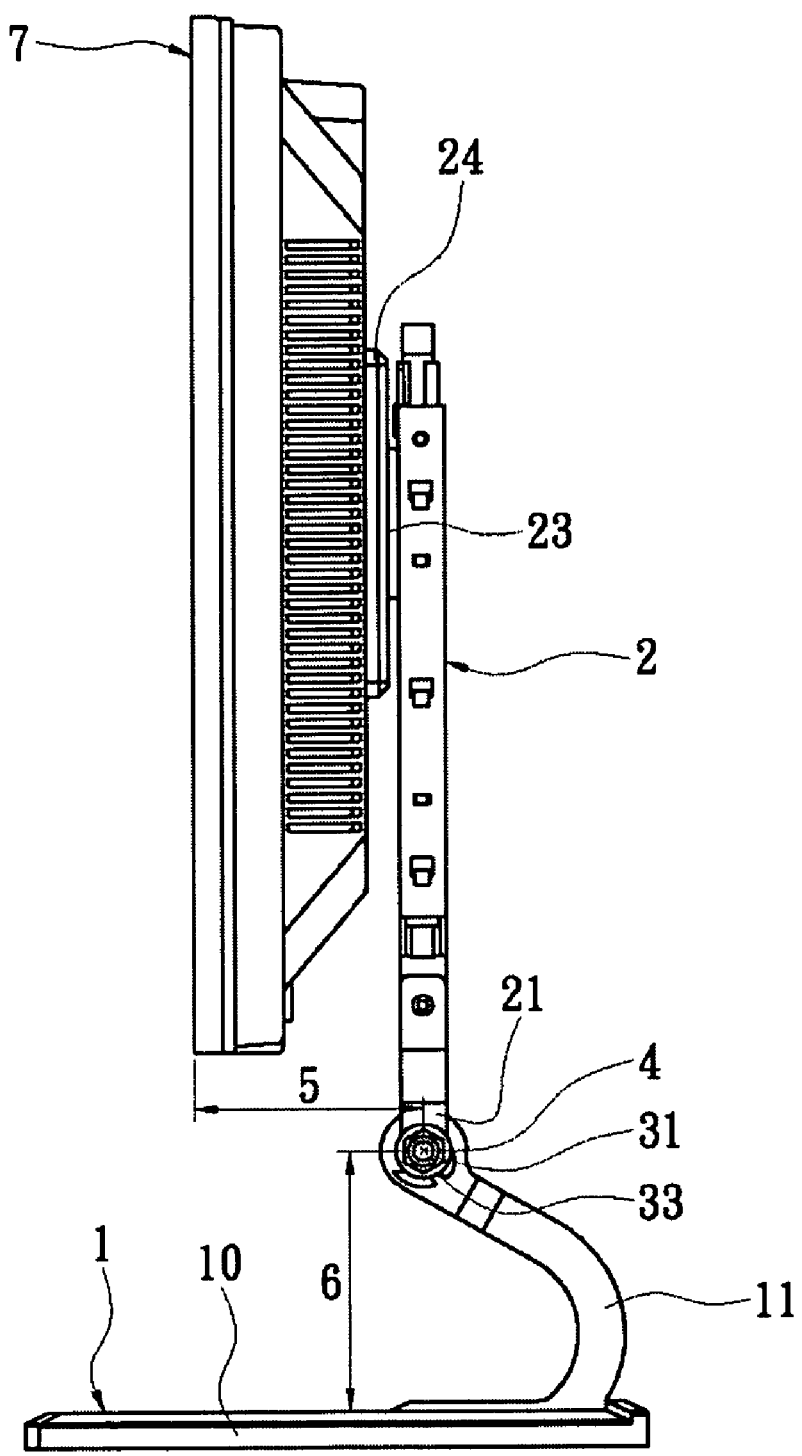
FIG. 5 is a side view of the foldable holder according to this invention.
Figure 7:
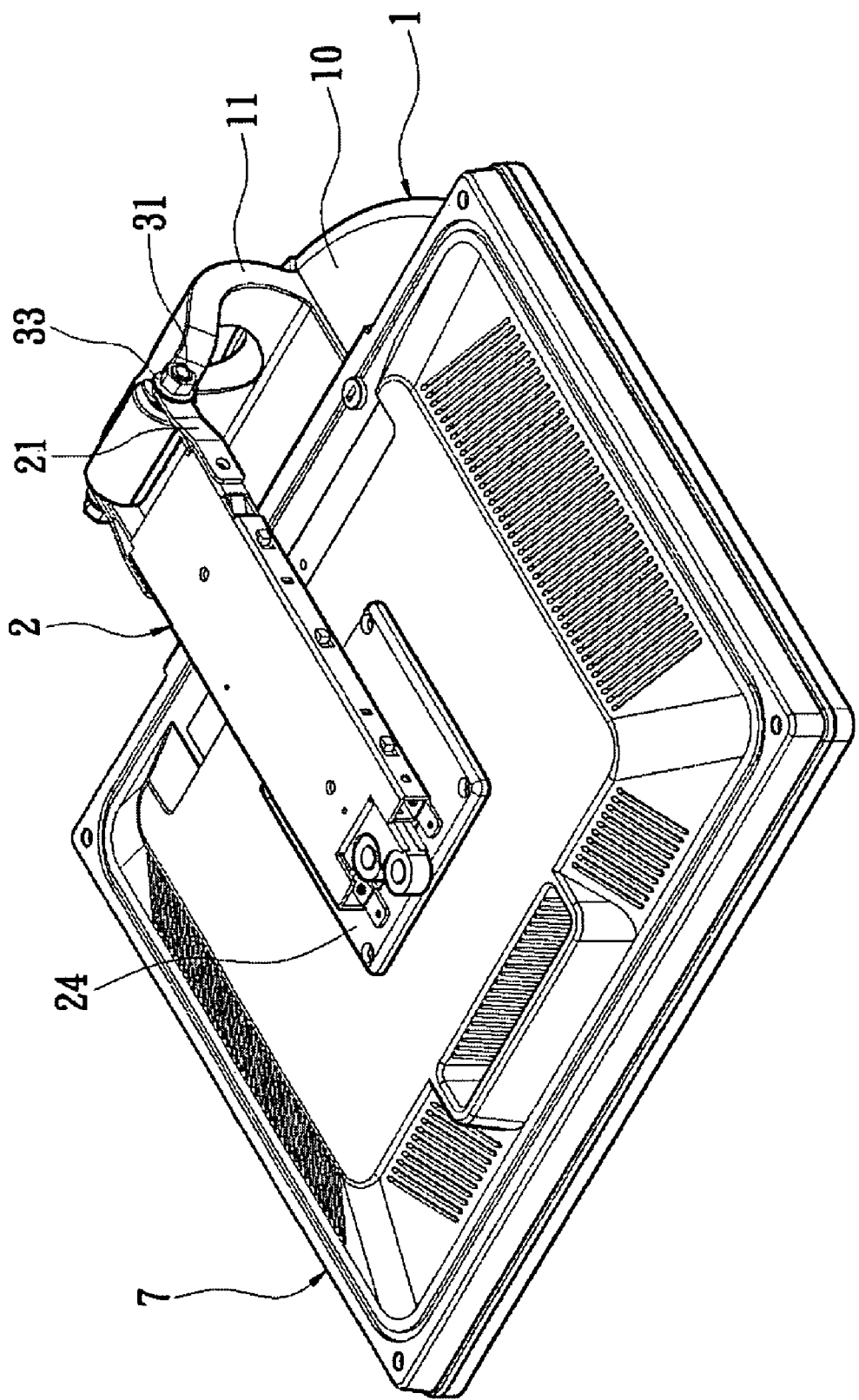
FIG. 7 is a 3D view of the foldable holder according to this invention that is bent and folded.

With reference to FIGS. 5, 7, and 8, a hinge 4 connects the swinging part 2 to the pillar 11. The pivot axis and gasket assembly 3 is then provided on the hinge 4. The swinging part 2 swings on the pillar 11 around the hinge 4.

The distance from a front side of the display 7 to the hinge 4 is defined as swinging distance 5. Further, the distance from the hinge 4 to the top surface of base 10 of mount 1 is defined as turn height 6. The turn height 6 is larger than the swinging distance 5.

With the members and the conditions of distance, before packing and handling the holder and the supported display 7, the user may turn and fold the display 7 and the swinging part 2 for combination and locate the display 7 to a site parallel with the base 10 by using the gaskets 33. The turn height 6 is larger than the swinging distance 5, so the display 7, when being turned and folded, does not interfere and collide with the base 10.

As described above the equivalent change of this invention may be considered, as long as the swinging part 2 is used to locate the display 7 in the manner of swinging to the site parallel with the base 10 and the relationship between the swinging distance 5 and the turn height 6.

The virtues and features of this invention are described below.

The swinging part 2 may be foldable together with the display 7 and parallel with the base 10 of mount 1. Thus, the space occupied by the holder and the loaded display 7 may be significantly reduced, and the manners of packing, handling and storage are applied to lower the cost of business shipment and satisfy a user's daily life at home.

The swinging part 2 and its connected display 7 and the base 10 after folded for the geometrical form tend to be simplified so as to significantly reduce an unused space of a carton for packing and reduce the quantity of Styrofoam as a filler of high pollution which brings the quite high benefit in environmental protection.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A foldable holder, supporting a display and comprising:
   a mount comprising a base and a pillar disposed on the base; and
   a swinging part pivoting around the pillar and having a front side, a slide groove, and a slide base, wherein the slide groove and the slide base are provided in the front side, the slide base is slidably arranged on the groove, the display is slidably disposed at the front side of the swinging part via the slide base, the swinging part is capable of rotating to a position where the swinging part is parallel to the base and a front side of the display faces a top surface of the base;
   wherein a hinge connects the swinging part to the pillar, the distance from the front side of the display to the hinge is defined as the swinging distance, the distance from the hinge to the top surface of the base of the mount is defined as the turn height, the turn height is larger than the swinging distance;
   wherein the display is able to slide toward the pillar of the mount while the front side of the display facing the base for reducing a space occupied by the foldable holder and the display.

2. The foldable holder according to claim 1, wherein at least one pivot-axis-and-gasket assembly is provided at the hinge between the swinging part and the pillar and the swinging part and the pillar pivot around the pivot-axis-and-gasket assembly.

3. The foldable holder according to claim 2, the at least one pivot-axis-and-gasket assembly comprising two pivot-axis-and-gasket assemblies which each include a pivot axis having a head, wherein a shaft hole is transversally passing through the pillar, the swinging part is provided with two ears each of which is formed with a pivot hole which is aligned with the shaft hole at either end, each of the pivot axes passes through each of the pivot holes of the two ears to be inserted into the shaft hole, and the head of the pivot axis is set close to the outer surface of each of the two ears.

4. The foldable holder according to claim 3, wherein each of the two pivot-axis-and-gasket assemblies includes a plurality of gaskets provided on the pivot axis, each of which is provided at the inner surface of each of the two ears and between the outer surface of each of the two ears and the head of the pivot axis.

5. The foldable holder according to claim 4, wherein the slide base has a support plate on which the display is set.

6. The foldable holder according to claim 1, wherein the base of the mount is formed as a plate with the approximate shape of a crescent moon.

7. The foldable holder according to claim 1, wherein the pillar is a bent plate.

\* \* \* \* \*